RECORDING DISK CLAMPING DEVICE

Filed Jan. 6, 1953

INVENTOR.
ULRIC O. HUTTON
BY
Harry M. Saragovitz
Attorney

Patented Dec. 15, 1953

2,662,804

UNITED STATES PATENT OFFICE 2,662,804

RECORDING DISK CLAMPING DEVICE

Ulric O. Hutton, Brinklow, Md., assignor to the United States of America as represented by the Secretary of the Army Application January 6, 1953, Serial No. 329,820

3 Claims. (Cl. 346—137)

This invention relates to recording instruments and more particularly to a device for stretching and clamping a disk or annular ring of a magnetic recording material on a plastic or similar base.

In electrical recording apparatus designed for the recording of electrical impulses in a form in which they may be later reproduced automatically at predetermined intervals, it is necessary at all times for the plastic recording disk to be in a taut condition and without mechanical damage on the recording disk holder.

It is an object of the present invention therefore to provide a clamping device in which the magnetic recording disk is constrained to lie flat in relation to the pickup heads and in a true plane perpendicular to the driving axis.

It is another object of the invention to provide a clamping device in which the magnetic recording disk is stretched lightly and uniformly on the disk holder.

For a better understanding of the present invention, together with other and further objects thereof, reference is had to the following description taken in connection with the accompanying drawing in which.

Figure 1:
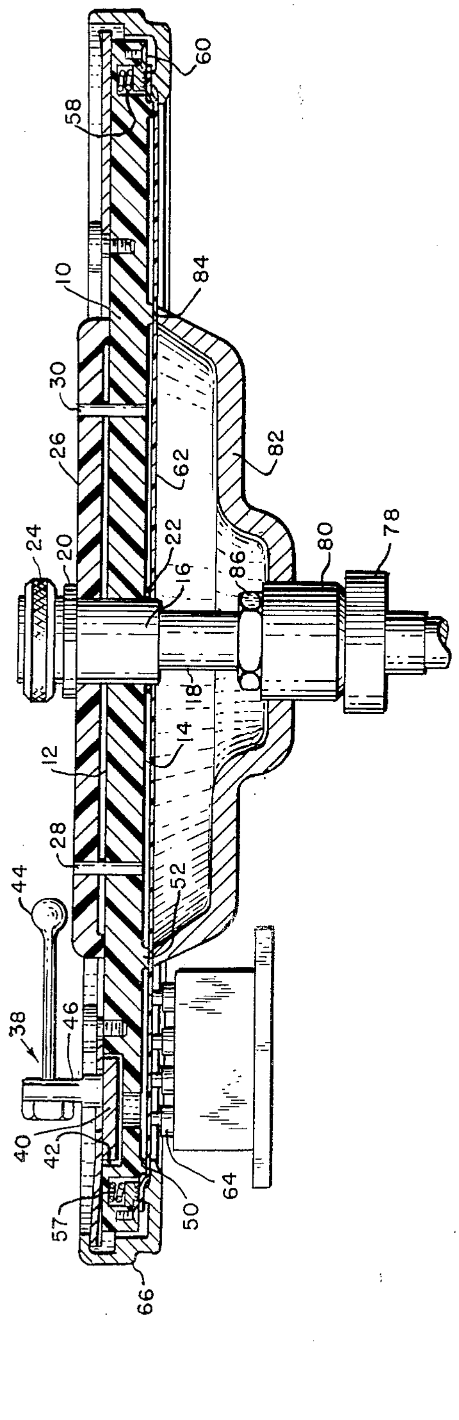
Figure 1 is a cross-sectional view of the clamping device.
Figure 2:
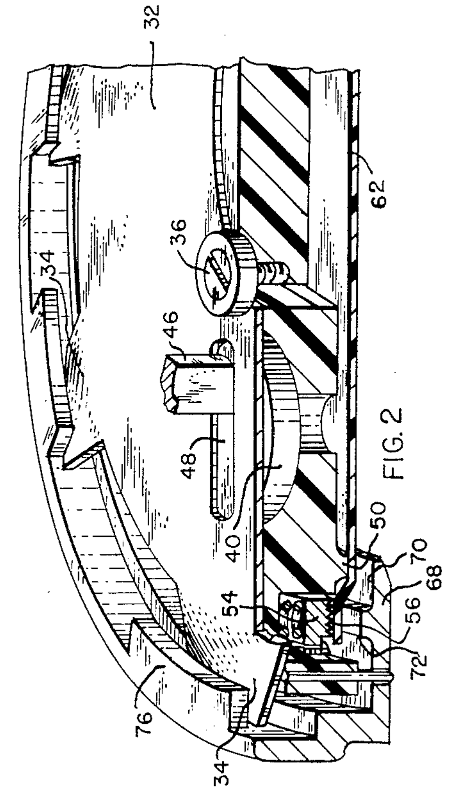
Figure 2 is a fragmentary perspective view of the clamping device.

Referring now to Figs. 1 and 2 of the drawing, there is shown at 10 a recording disk holder, preferably made of plastic or other suitable material, having top and bottom surfaces 12 and 14 and provided with a central hub 16 adapted to fit over the upper portion of vertical drive shaft 18. Hub 16 is maintained in position by means of flange 20 and snap spring 22 and is clamped to shaft 18 by means of clamp nut 24. Encompassing hub 16 and positioned between hub flange 20 and top surface 12 is a circular washer 26 which is affixed to disk holder 10 by means of vertical pins 28 and 30. Surrounding washer 26 and radially spaced therefrom, there is provided a flat annular spring lock member 32, the outer periphery of which is provided with equally spaced lugs 34 extending slightly beyond the circumferential periphery of disk holder 10. As shown, spring lock member 32 is maintained in position at its inner periphery by means of a plurality of circumferentially spaced screw-washer assemblies 36 so arranged as to permit rotational movement of spring lock member 32 in either clockwise or counterclockwise directions along top surface 12. Spring lock member 32 is actuated by means of an eccentric 38 comprising a disk 40 rotatably mounted in circular recess 42, and a crank handle 44 affixed to shaft 46 extending upwardly from disk 40 through elongated slot 48 provided in spring lock member 32. The depth of recess 42 is such that the upper surface of eccentric disk 40 is flush with top surface 12 of disk holder 10. By this arrangement, spring lock member 32 may be rotated either clockwise or counterclockwise, the rotational movement in either direction, of course, being limited by the confines of elongated slot 48.

Bottom surface 12 of disk holder 10, hereinafter referred to as the operating surface, is provided with two spaced concentric embossments 50 and 52 having coplanar flat exposed surfaces. Encompassing embossment 50, hereinafter referred to as the outer embossment, is an annular clamp ring 54 having an exposed serrated surface 56. As shown, clamp ring 54 floats on compression springs 57 uniformly spaced in circular channel 58 and is maintained in position by circumferentially disposed screw heads 60 which are at approximately the same level as the exposed surface of embossments 50 and 52. A plastic magnetic recording disk 62 is provided on operating surface 12 in the usual manner opposite the recording head 64. Recording disk 62 is clamped into place by means of a substantially U-shaped ring 66 which encompasses the outer periphery of disk holder 10.

As shown, one arm of ring 66 is provided with a circular, inwardly extending flanged portion 68 having a peripheral flat surface 70 in abutment with the surface of recording disk 62 and aligned with the exposed flat surface of outer embossment 50. Flanged portion 68 is provided with an annular embossment 72 having an exposed flat surface in abutment with the surface of recording disk 62 and aligned with the circular serrated surface 56 of clamp ring 54. The other arm of ring 66 is provided with circumferentially spaced inwardly extending latch members 76, the number of latches being equal to the number of lugs 34 on spring lock member 32. With lugs 34 in position under latch members 76, U-shaped clamp ring 66 is locked into position.

The lower portion of shaft 18 is journaled in bearing 78 and is encompassed by a sleeve 80 to which is affixed a substantially U-shaped hollow casting 82 having a precise machined flat periphery 84 circumferentially aligned with embossment 52 on operating surface 12. Sleeve 80 is rigidly positioned by means of nut 86.

In operation, plastic disk 62 is clamped first between the faces of serrated surface 56 and annular embossment 72. By operating crank handle 44 and further moving of spring lock member 32 towards the locked-in position, ring 54 forces the compression of springs 57 thereby drawing the plastic recording disk 62 taut over concentric embossments 50 and 52. Thus, with spring lock member 32 in the locked-in position, recording disk 62 is maintained taut in a flat plane. When disk holder 10 is placed in drive shaft 18 and clamp nut 24 is tightened, the precise machined surface of periphery 84 is in perfect alignment to provide a true plane perpendicular to driving shaft 18. Washer 26 permits the clamp nut pressure to be directly applied to the surface of periphery 84 without tendency to warp disk holder 10.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for retaining a circular recording medium mounted on a disk holder having at least two concentric embossments on one surface thereof comprising a circular channel intermediate the outermost embossment and the periphery of said disk holder, a plurality of compressible springs disposed within said channel, an annular clamp ring within said channel in abutment with said compressible springs and having an exposed serrated surface contiguous to said recording medium, means circumferentially surrounding said annular clamp ring for retaining said ring within the confines of said channel when said springs are in the non-compressed state, a substantially U-shaped clamp ring engirdling said disk holder, one arm of said U-shaped clamp ring having an inwardly extending circular flanged portion aligned with said outermost embossment and an annular embossment aligned with said serrated surface, and means slidably mounted on the other surface of said disk holder and adapted to be engaged with said U-shaped clamp ring for locking said clamp ring in position around the periphery of said disk holder whereby said springs are compressed to maintain said recording medium taut over said concentric embossments.

2. A device for retaining a circular recording medium mounted on a disk holder having at least two concentric embossments on one surface thereof comprising a circular channel intermediate the outermost embossment and the periphery of said disk holder, a plurality of compressible springs disposed within said channel, an annular clamp ring within said channel in abutment with said compressible springs and having an exposed serrated surface contiguous to said recording medium, means circumferentially surrounding said annular clamp ring for retaining said ring within the confines of said channel when said springs are in the non-compressed state, a substantially U-shaped clamp ring engirdling said disk holder, one arm of said U-shaped clamp ring having an inwardly extending circular flanged portion aligned with said outermost embossment and an annular embossment aligned with said serrated surface, the other arm of said U-shaped clamp ring having circumferentially spaced inwardly extending latch members, an annular spring lock member in abutment with the other surface of said disk holder and rotatably mounted thereon, the outer periphery of said spring lock member having circumferentially spaced lugs, and means operatively associated with said spring lock member for positioning said lugs under said latch members whereby said springs are compressed to maintain said recording disk taut over said concentric embossments.

3. The device as defined in claim 2 wherein said last mentioned means comprise a circular recess in said disk holder, a disk rotatably and slidably mounted in said recess, an elongated slot in said spring lock member, and an eccentrically mounted shaft extending upwardly from said disk through said elongated slot, and a crank handle affixed to said shaft.

ULRIC O. HUTTON.

References Cited in the file of this patent

UNITED STATES PATENTS

| Number | Name | Date |
|---|---|---|
| 926,763 | Phillips | July 6, 1909 |
| 1,240,883 | Sattler | Sept. 25, 1917 |
| 1,356,674 | Menns | Oct. 5, 1920 |
| 2,146,378 | MacDuff | Feb. 7, 1939 |